US005702040A

United States Patent [19]
Hedeen

[11] Patent Number: 5,702,040
[45] Date of Patent: *Dec. 30, 1997

[54] BICYCLE CARRIER

[76] Inventor: Nils E. Hedeen, 2741 N. Campbell Ave., Chicago, Ill. 60647-1922

[ * ] Notice: The term of this patent shall not extend beyond the expiration date of Pat. No. 5,558,261.

[21] Appl. No.: 683,099

[22] Filed: Jul. 16, 1996

Related U.S. Application Data

[63] Continuation-in-part of Ser. No. 353,093, Dec. 9, 1994, Pat. No. 5,558,261.

[51] Int. Cl.$^6$ .................. B60R 9/10; B60R 9/06
[52] U.S. Cl. .......... 224/511; 224/314; 224/329; 224/315; 224/492; 224/493; 224/569; 224/535; 224/536; 224/537; 224/924; 70/259
[58] Field of Search ............... 224/42.13, 924, 224/511, 500, 535, 536, 537, 494, 495, 329, 314, 493, 492, 315, 569; 248/316.4, 316.6, 229.12, 229.22, 228.3, 237.41; 211/17, 8; 70/259, 260, 226; 24/524; 269/228

[56] References Cited

U.S. PATENT DOCUMENTS

| | | | |
|---|---|---|---|
| 140,136 | 6/1873 | Holt et al. | 269/228 |
| 1,798,239 | 3/1931 | Welker et al. | 224/511 |
| 2,379,107 | 6/1945 | Scheck | 269/228 |
| 2,432,249 | 12/1947 | Pearson | 224/515 |
| 3,972,457 | 8/1976 | Kesler | 224/42.13 |
| 5,067,641 | 11/1991 | Johnson et al. | 224/536 |
| 5,085,360 | 2/1992 | Fortune et al. | 224/42.13 |
| 5,092,426 | 3/1992 | Rhodes | 269/228 |

*Primary Examiner*—Linda J. Sholl
*Attorney, Agent, or Firm*—Douglas B. White

[57] ABSTRACT

The carriers described herein employ an adjustable locking member to secure the carrier to the rear of a vehicle. A locking channel incorporates a cam lever used to adjust and lock the carrier and renders the mechanism inaccessible when locked. Apparatus for supporting and stabilizing a bicycle protrudes rearwardly from the base member.

11 Claims, 10 Drawing Sheets

BICYCLE CARRIER

This is a Continuation-in-Part of Ser. No. 08/353,093, filed Dec. 9, 1994 now U.S. Pat. No. 5,558,261.

BACKGROUND OF THE INVENTION

1. Field of the Invention

This invention relates generally to apparatus which attaches to automobiles for carrying bicycles, and more specifically to carriers which provide a high level of security.

2. Description of the Prior Art

Prior art bicycle carriers typically attach to a trunk lid or bumper and are typically vulnerable to theft, and this is particularly true for designs which are adjustable. Recently, a carrier has been marketed which attaches to a rear mounted spare tire by use of a strap attachment which is easily cut, rendering the carrier and bike susceptible to theft.

SUMMARY OF THE INVENTION

The present invention not only provides a secure attachment, but it also accommodates a variety of mounting dimensions and positions on vehicle bumpers and trunks.

The carriers of the present invention employ an adjustable member for securing the carriers between the lower edge of the trunk lid or rear door and the upper edge of the trunk lid or rear door, and a unique locking mechanism is employed to facilitate secure attachment. In an alternative embodiment, the adjustable member is flexible to accommodate the contour of the vehicle. Apparatus for supporting and stabilizing a bicycle protrudes rearwardly and also employs a similar locking mechanism to secure the bicycle.

While the invention will be described in connection with a preferred embodiment, it will be understood that it is not the intent to limit the invention to that embodiment. On the contrary, it is the intent to cover all alternatives, modifications, and equivalents as may be included within the spirit and scope of the invention as defined by the appended claims.

DESCRIPTION OF THE PREFERRED EMBODIMENT

Figure 1:
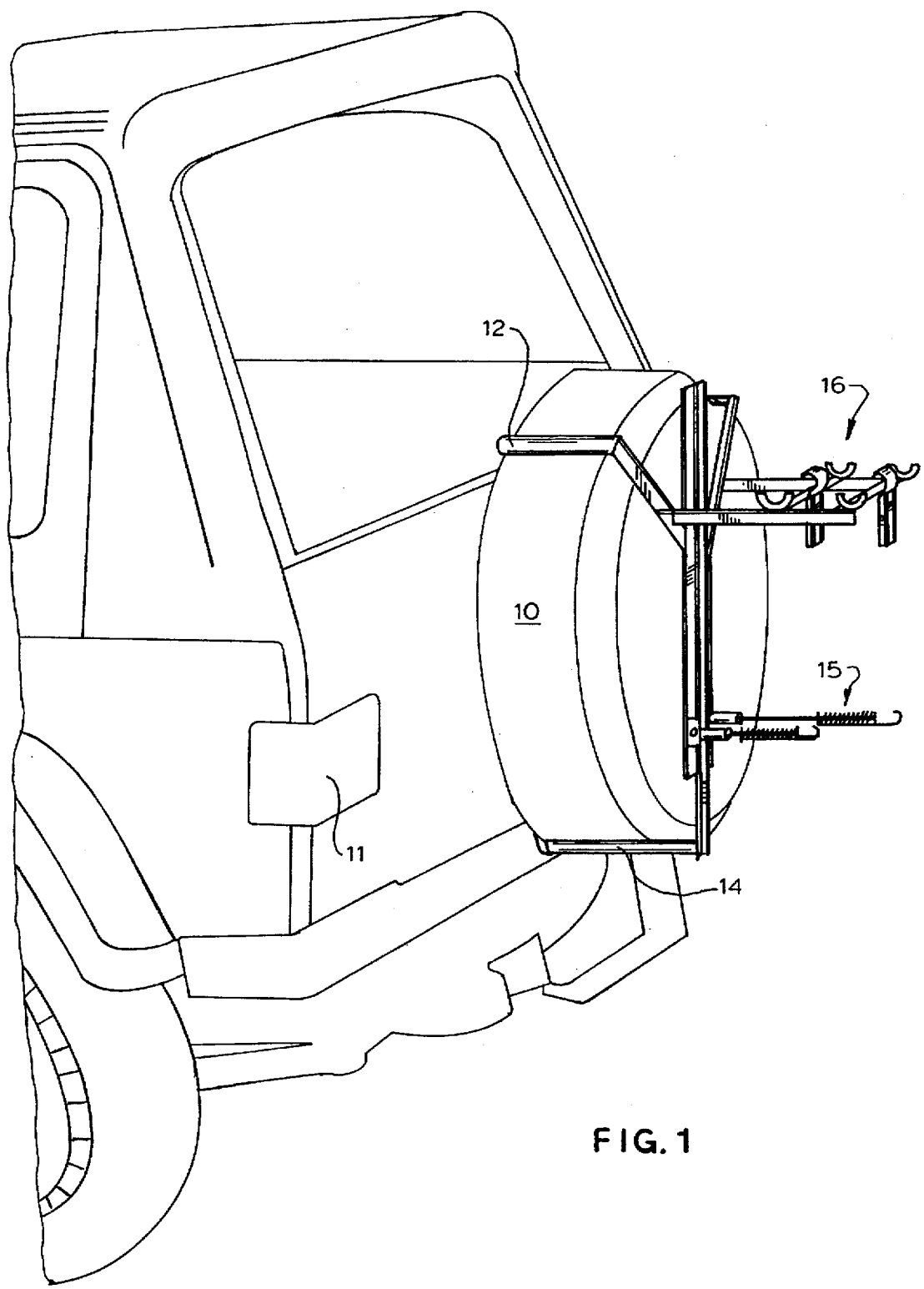
FIG. 1 is a pictorial view of a carrier in accordance with the present invention installed on a rear mounted spare tire.

Turning first to FIG. 1 there is shown a bicycle carrier described in my co-pending application, Ser. No. 08/353, 093 now U.S. Pat. No. 5,558,261, of which this is a continuation-in-part. That carrier is attached to a rear mounted spare tire 10 of an automobile. As shown most clearly in FIG. 2, upper hooks 12 protrude in spaced relation from a defined base section 17. The lower hook 14 (or hooks) protrudes from a piston-like slide member 18 constrained to move within a channel 20 defined on the base frame structure. At its upper end this slide member is attached to an adjustable locking lever 22.

Figure 3:
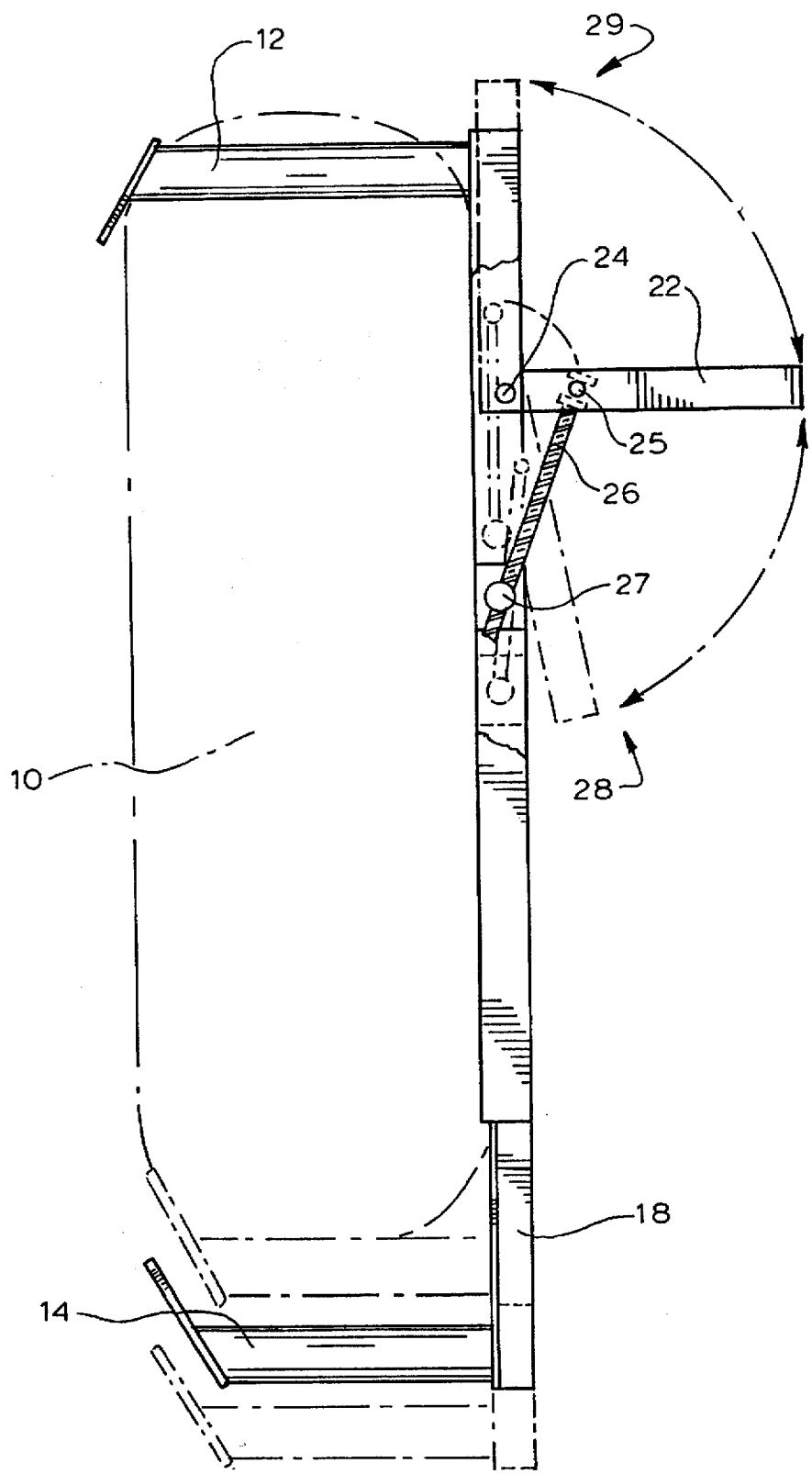
FIG. 3 is a side view, partially cut away, of the carrier of FIG. 1.

The adjustable locking mechanism (depicted in detail in FIG. 3) employs a lever 22 pivotally attached to the base structure at pivot 24. A threaded bolt member 26 is pivotally attached to the slide member 18 at one end and attached to the lever 22 at its other end through a pivotally mounted retainer 25 which allows axial rotation. By use of a threaded nut 27 at the connection to the slide, axial rotation of the bolt 26 within the retainer and threaded nut causes it to lengthen/ shorten the distance between the locking lever and the slide member. In this manner the distance between the upper and lower hooks is adjustable to adapt to any size tire (or other object) to which the carrier is attached.

Once the distance between the hooks is adjusted, the carrier is clamped to the tire. First, the cam lever is placed in the lower position 28, causing the lower hook to extend. Then the cam lever is raised to the upper position 29, retracting the lower hook, to thereby clamp the carrier onto the tire. With the locking lever in this upper position, holes 30a in the lever (FIG. 2) now line up with holes 30b in the base section to allow for the addition of a padlock. As a further anti-theft feature of this carrier, when the cam lever is placed in its upper position, the threaded bolt 26 lies within the narrow channel 20 and is inaccessible.

In the two embodiments shown in FIGS. 7–11, the secure adjustment mechanism is adapted to trunk lids and rear doors. This is accomplished in part by the use of a connecting structural member positioned to extend partially or completely between the upper and lower attachment points for the carrier. Turning now to the embodiment shown in FIGS. 8 and 10, a base frame structure 110a is mounted to the trunk lid 111 of a vehicle. A lower hook member 112a and an upper hook member 114a clamp the trunk lid therebetween. A flexible structural member 118a (with a protective shield 119) extends between the hook members and is secured to the upper hook member 114a by a means of an adjustable locking mechanism 120a described in detail below and depicted in detail in FIG. 11. In the preferred embodiment this flexible structural member may comprise a plastic encased thick steel cable or a flexible steel bar, which due to its flexibility may bend over vehicle contour or obstructions.

Figure 7:
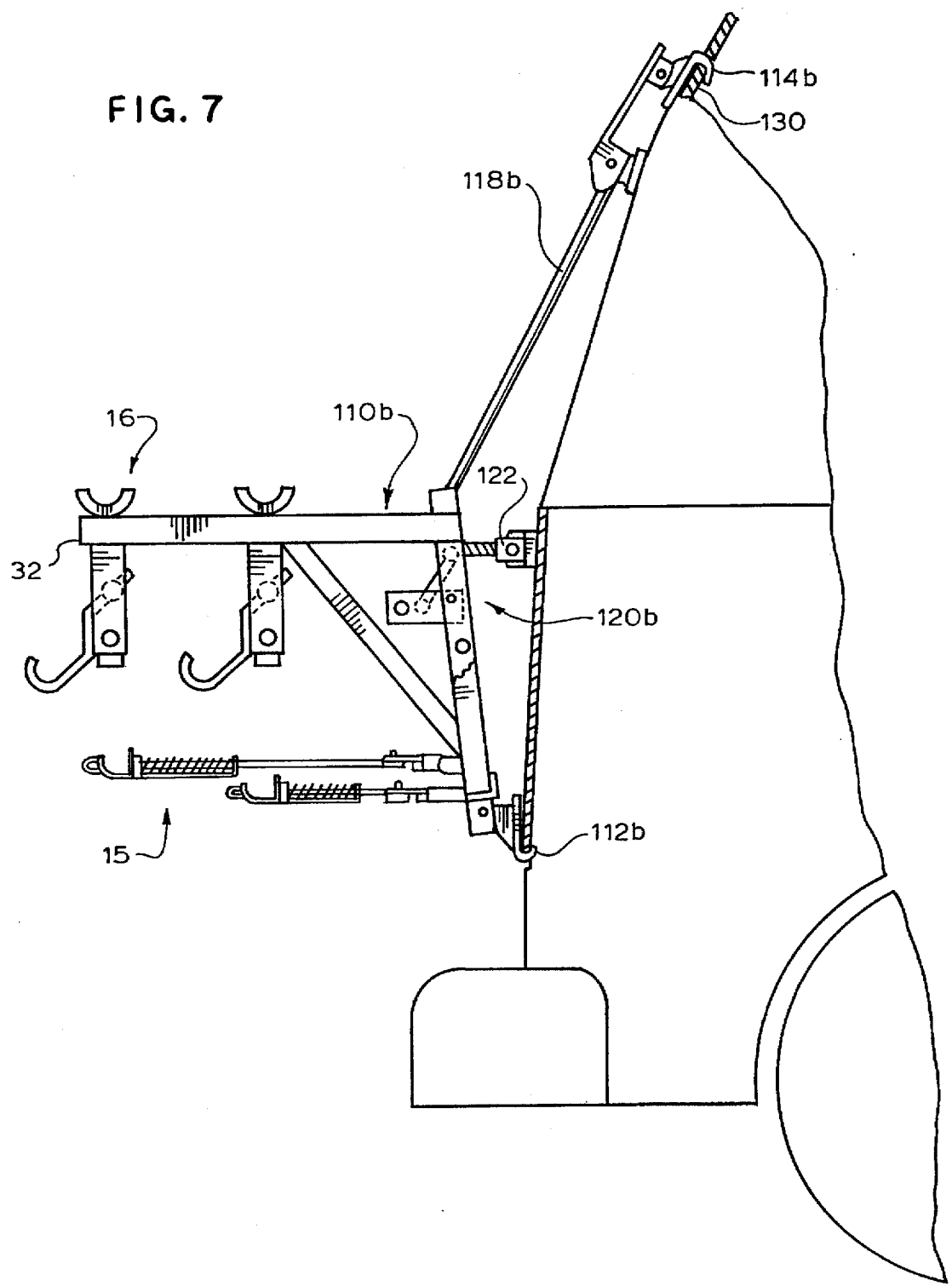
FIG. 7 is a side view of another embodiment of the invention showing the carrier mounted to the rear of a van type of vehicle.
Figure 8:
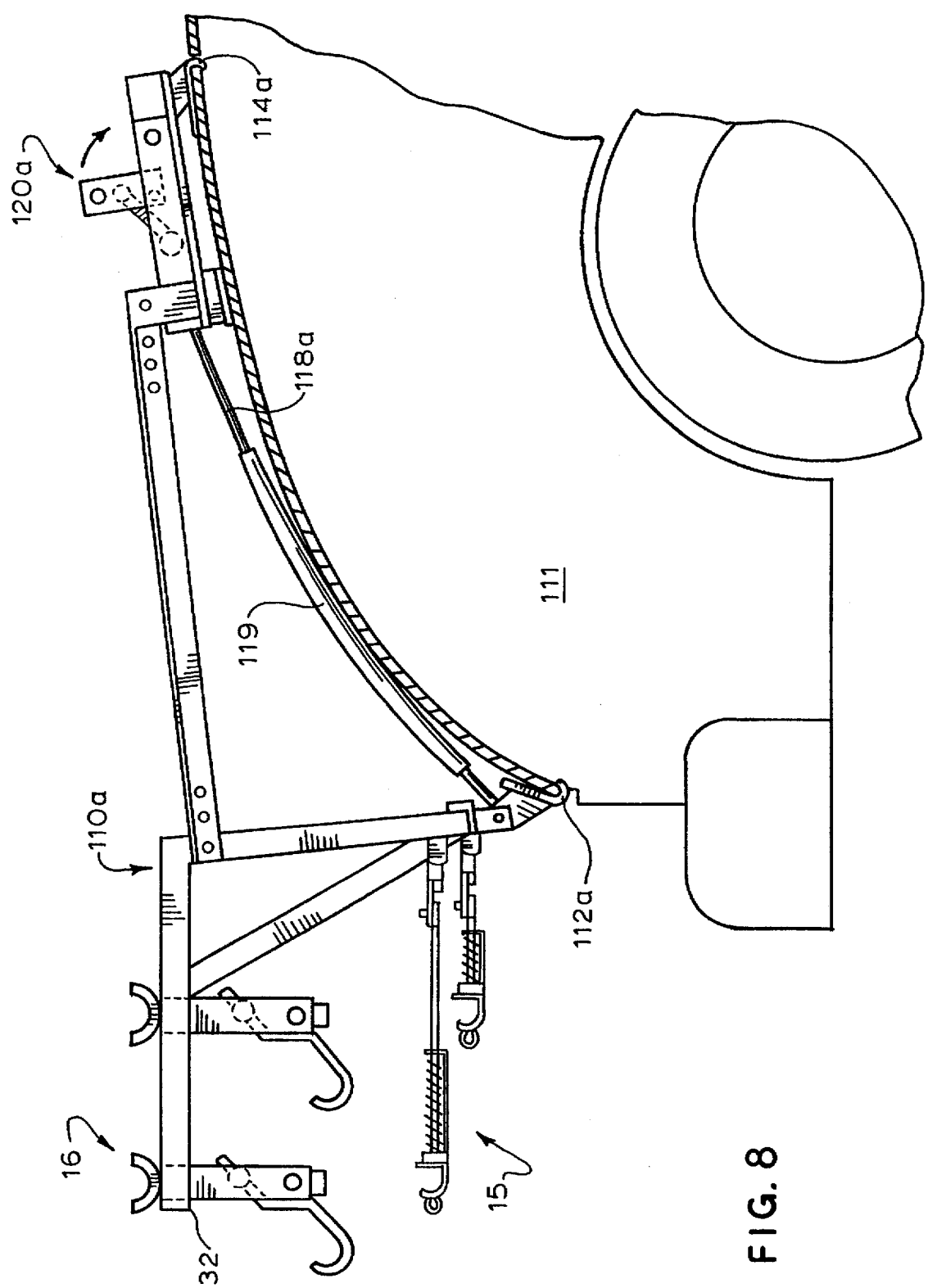
FIG. 8 is a side view of another embodiment of the invention showing the carrier mounted to the trunk lid of a vehicle.
Figure 9:
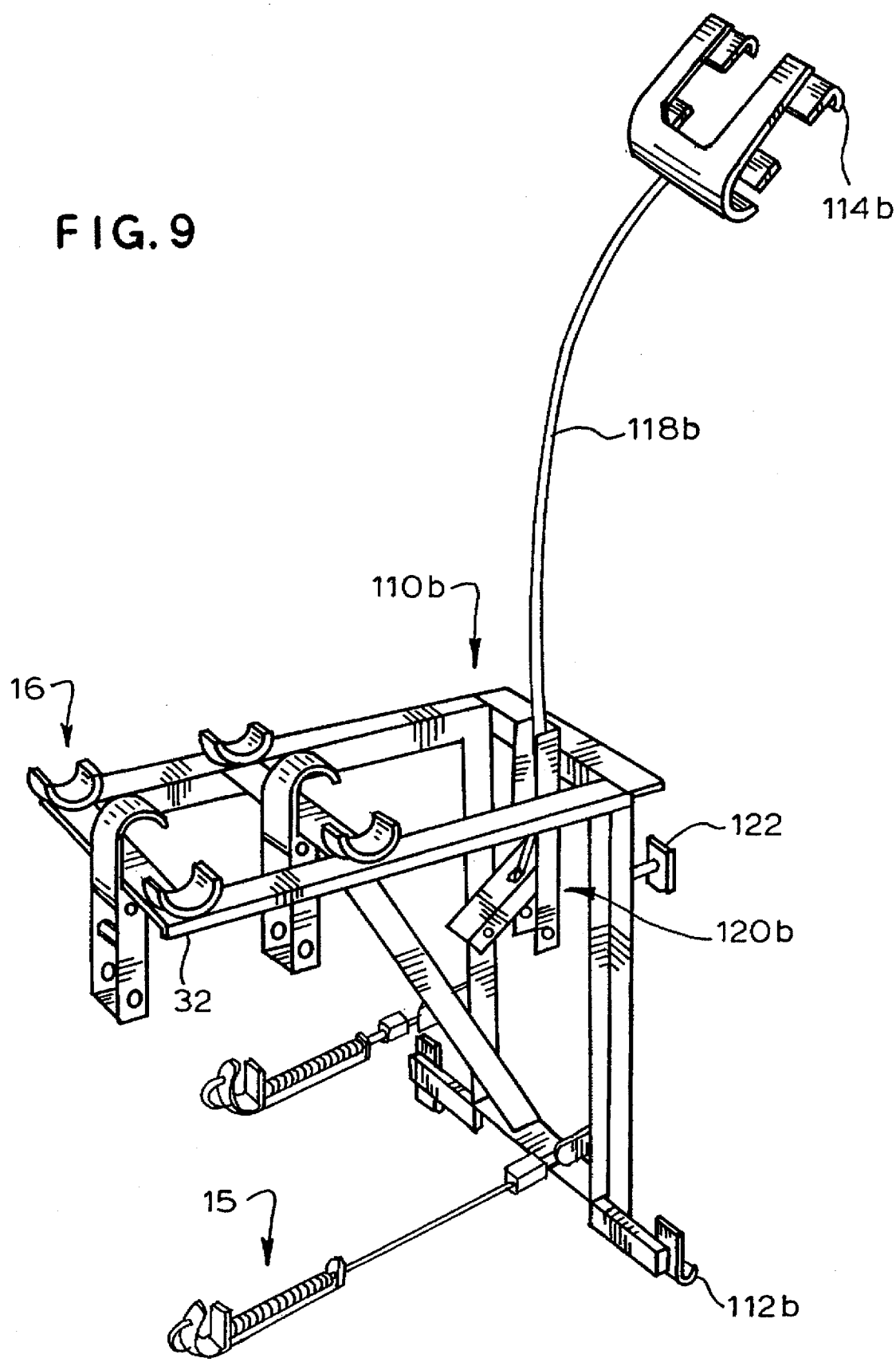
FIG. 9 is a perspective view of the carrier of FIG. 7.
Figure 10:
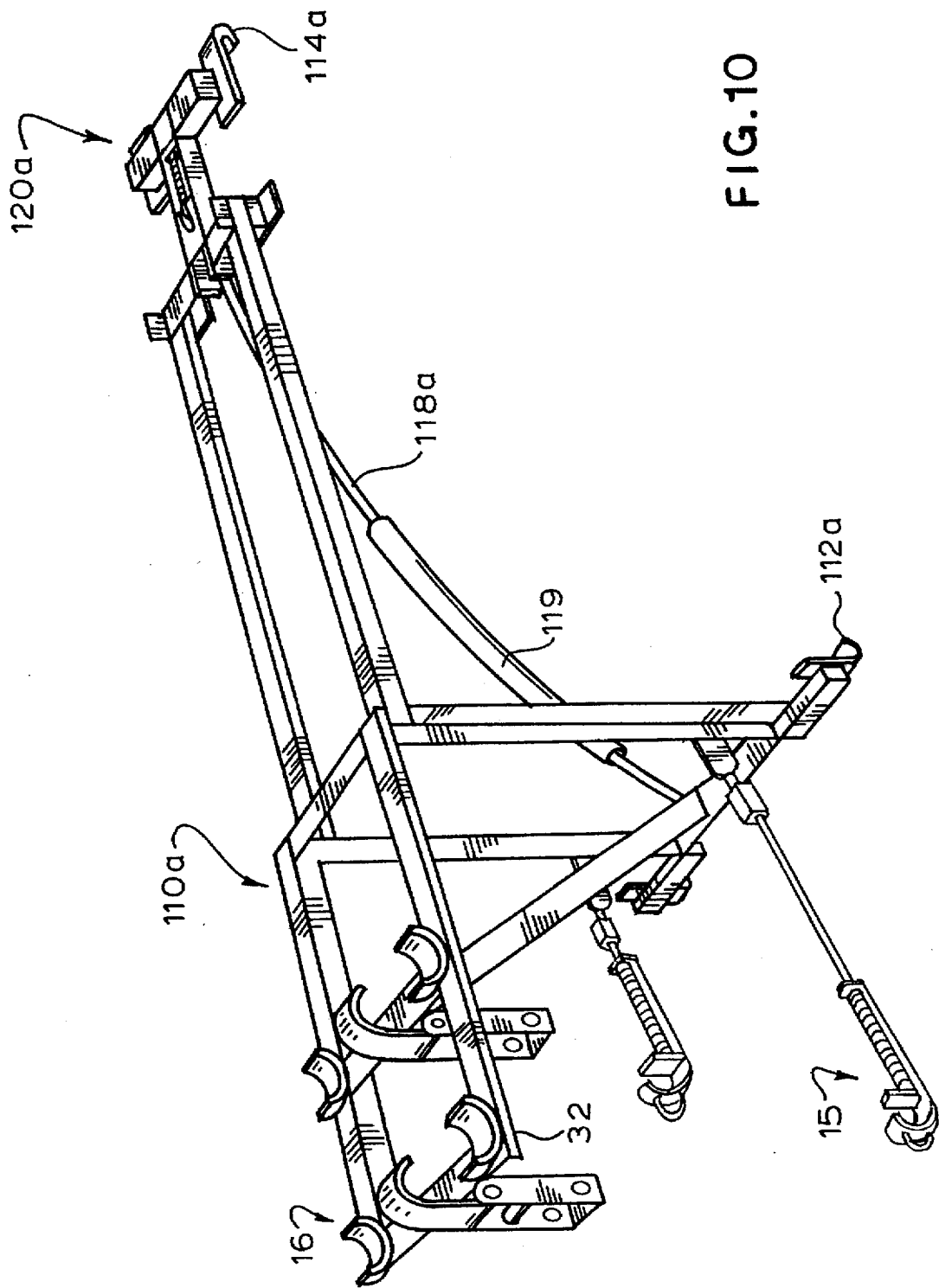
FIG. 10 is a perspective view of the carrier of FIG. 8.

Alternatively, a base frame structure of the carrier may be mounted to the rear of a van style vehicle (see FIGS. 7 and 9). In this embodiment the carrier base frame structure 110b has affixed thereto a lower hook member 112b, and positioning spacers 122. A flexible structural member 118b extends from an adjustable locking member 120b to the upper hook member 114b attached to the upper door edge 130 (or rain gutter).

Figure 11:
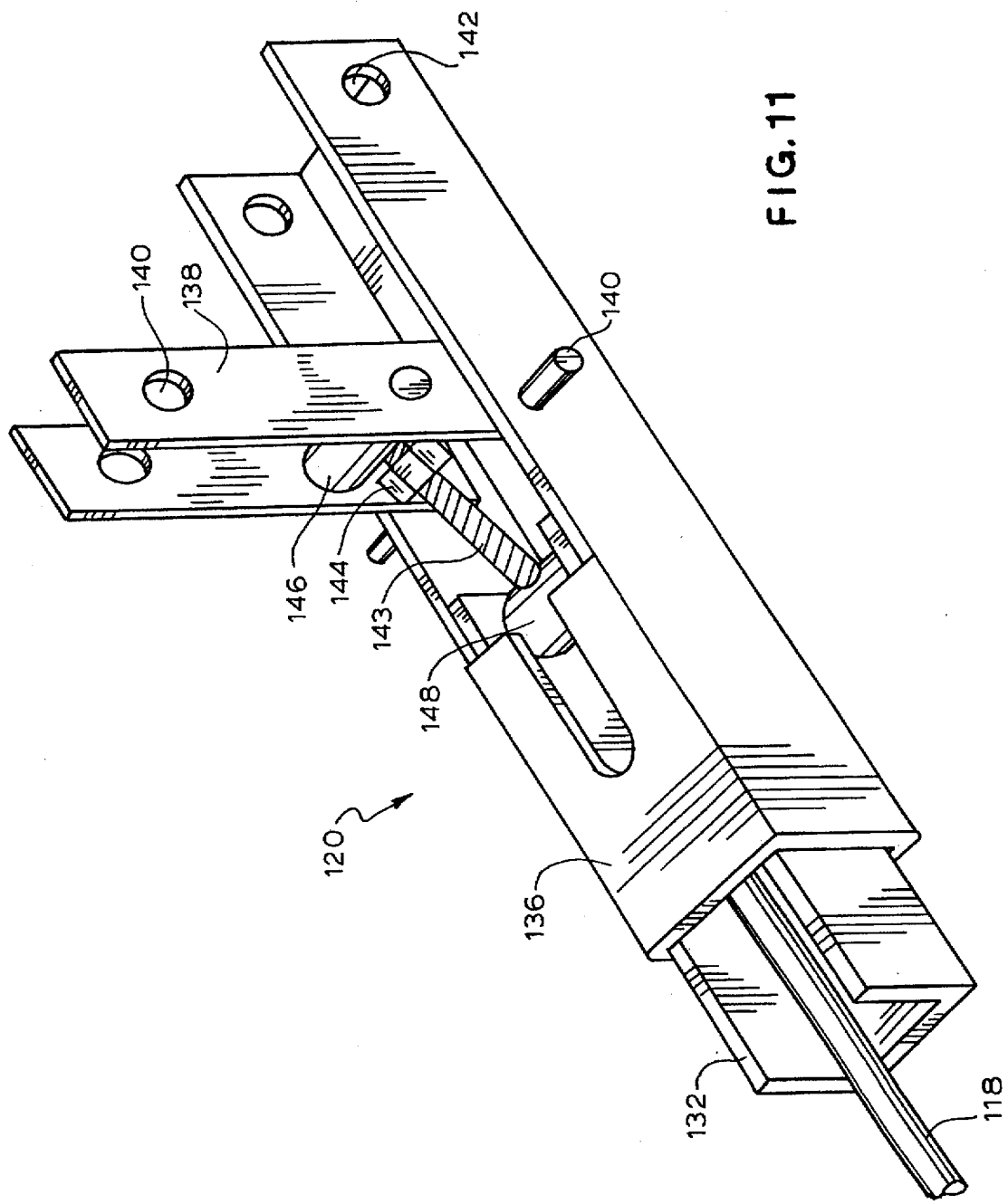
FIG. 11 is a perspective view of the adjustable locking mechanism employed with the carriers of FIGS. 7–10.

The connection of the flexible structural member to the base frame structure (FIG. 7) or to the upper hook member (FIG. 8) is accomplished by means of a secure adjustable locking mechanism 120 (depicted in FIG. 11). Particularly, the flexible member 118 attaches to the adjustable locking mechanism via attachment to a sliding piston member 132 (said means of attachment may be by weld, bolt, or other means well known in the art). This piston moves within the channel member 136 under control of the cam lever 138. This cam lever pivots on the pinned axis 140 to move between the released position shown in FIG. 11 and a latched position with the cam lever lying within the channel 136. When in this latched position the holes 140 in the cam lever align with the holes 142 in the channel member for receipt of a shackle of a padlock.

To provide adjustment for the length of the flexible structural member, a threaded connector 143 is provided between the piston 132 and the cam lever 138. This connector, in the form of a threaded bolt, is connected to freely rotate axially at its head 144 where it connects to a pivot 146 on the cam lever. At its other end, it connects to the sliding piston at a pivoting threaded nut 148. Rotation of the head 144 therefore causes the distance between the lever and piston to shorten or lengthen.

When the cam lever is unlatched as shown in FIG. 11, the bolt connector 143 is accessible and may be turned to effect adjustment. When the cam lever 138 is latched, pivoted downwardly and positioned within the channel, the bolt connector is inaccessible due to the close fit within the channel.

Once the appropriate carrier has been attached to the vehicle of choice, a bike is mounted onto the support 16. (In the preferred embodiments the carriers are adapted to hold two bikes, side by side.) The support 16 (shown in detail in FIGS. 6a–6d) comprises one or more saddles or troughs 31 of sufficient size and dimension to accept the frame tube of a bicycle. These troughs are positioned to span a pair of support arms 32 projecting rearwardly from the base frame structure.

Figure 2:
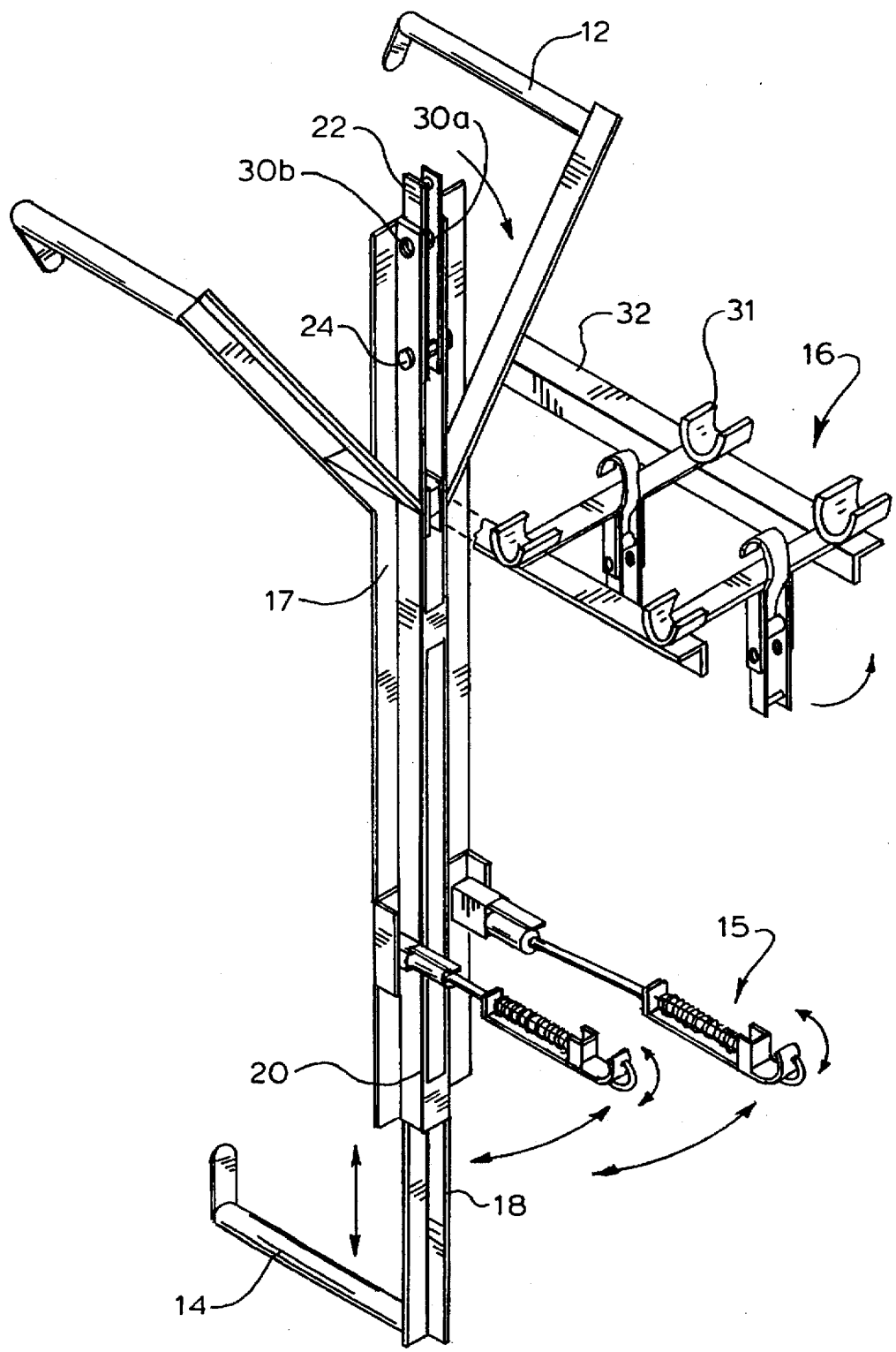
FIG. 2 is a perspective view of the carrier of FIG. 1.
Figure 6A:
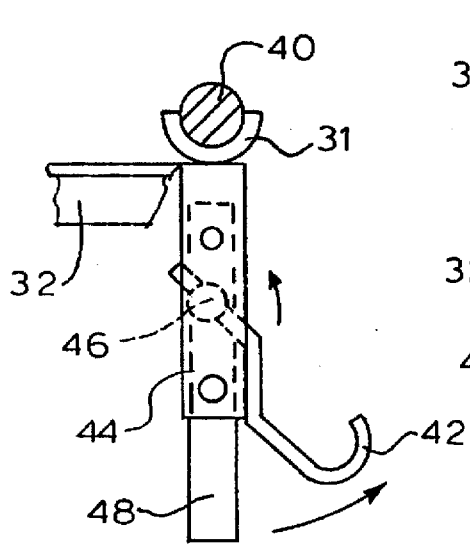
FIGS. 6a–6d illustrate the locking mechanism for securing a bicycle to the carriers.
Figure 6B:
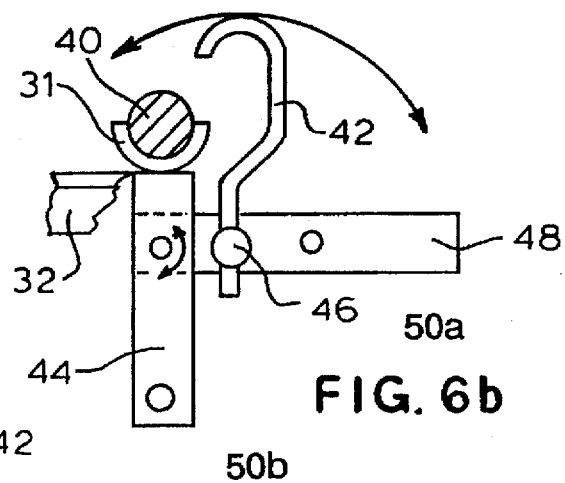
Figure 6C:
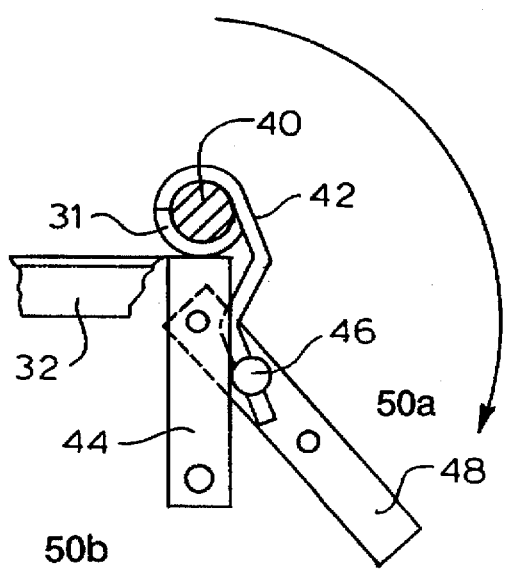
Figure 6D:
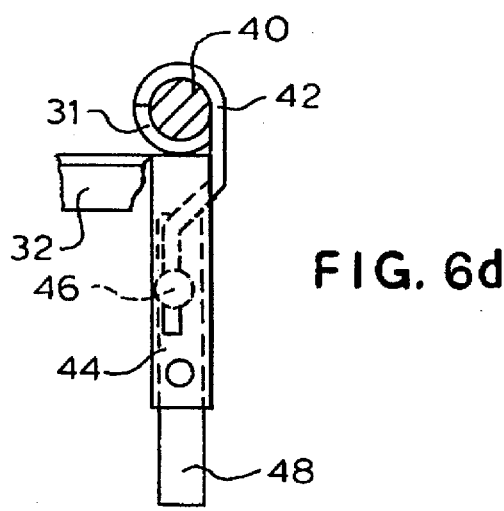

Attachment of the bike to the support is accomplished with a locking mechanism as illustrated sequentially in FIGS. 6a–6d. With a bicycle frame tube 40 positioned on the saddle 31, a hook member 42 is brought up and over the bicycle frame tube (FIG. 6b) and then into engagement therewith (FIG. 6c). The lower extremity of this hook is attached to a locking lever 48 through a pivotally attached threaded adjustment nut 46. This locking lever 48 is pivotally attached to a depending channel member 44 of the saddle member 31. By use of the adjustment nut 46 the reach of the hook can be selected to allow the locking lever to achieve a locked position (FIG. 6d). With this locking lever in the locked position, holes 50a in the locking lever now line up with holes 50b in the depending channel member 44 to allow the addition of a padlock. When in the locked position, as shown in FIGS. 2 and 6d, the adjustment nut 46 is enveloped within the depending channel member for security, in the same manner as the mechanism for locking the carrier onto the vehicle.

Figure 4:
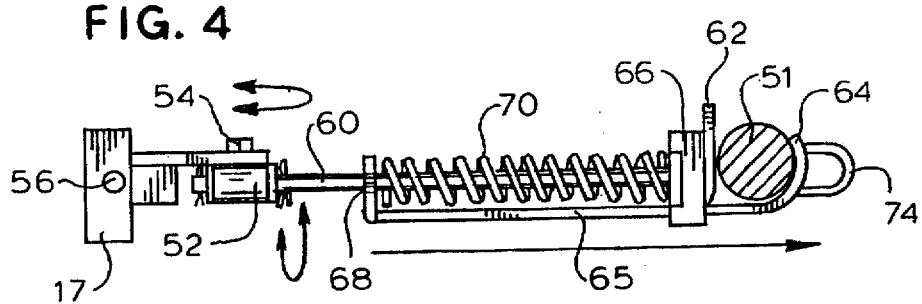
FIG. 4 is a top view of the bicycle stabilizing device.
Figure 5A:
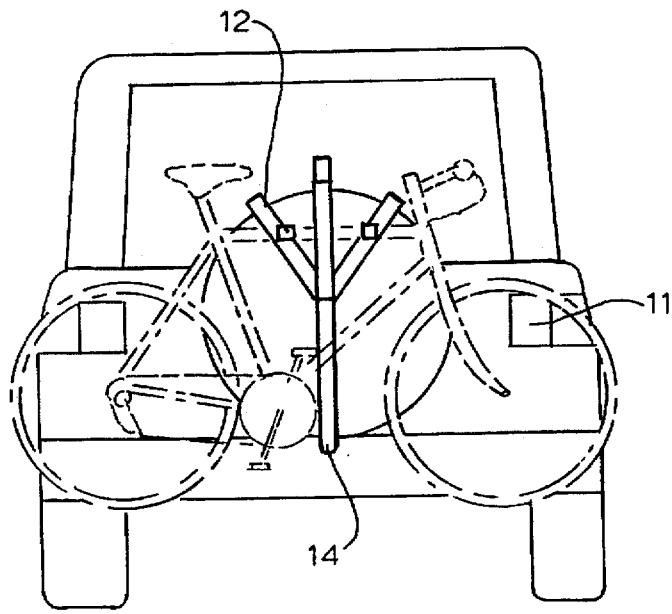
FIG. 5a depicts a typical mounting position for bicycles on the carrier of FIG. 1.
Figure 5B:
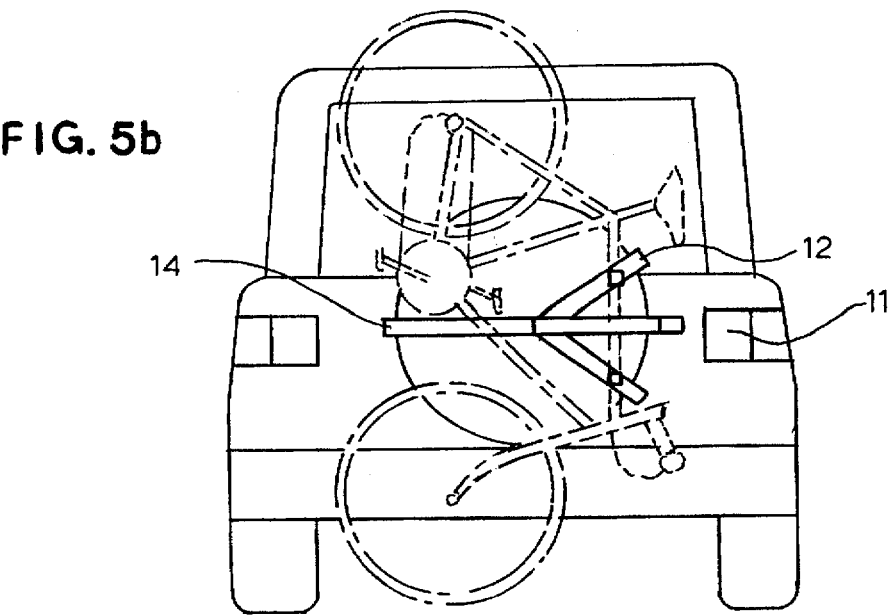
FIG. 5b depicts an alternative mounting position uniquely attainable with the carrier of FIG. 1.

Once the bicycle frame has been mounted into the support saddle 31, as described above, the stabilizers 15 (shown in detail in FIG. 4) are attached to the bicycle frame 51. These stabilizers are mounted to the carrier base frame structure through pivoting joints 52, 54 and 56 (or equivalent universal joint). Extending from this jointed attachment is a first stabilizer arm 60 which terminates in a first jaw 62. A second jaw 64 is integral with a second sliding arm 65 which extends parallel to the first arm and through a block 66 carried on the first arm. This second arm slidingly engages the first stabilizer arm at attachment 68 such that a spring 70 between that attachment and the block biases the jaws closed against the bicycle frame 51. A loop handle 74 allows one to pull the second jaw open for easy attachment to the bicycle frame.

From the foregoing description, it will be apparent that modifications can be made to the apparatus and method for using same without departing from the teachings of the present invention. Accordingly, the scope of the invention is only to be limited as necessitated by the accompanying claims.

I claim:

1. A bicycle carrier for attachment to upper and lower rear edges of a vehicle comprising:

a base member exhibiting a locking channel thereon;

first hook means mounted to said base member, and second hook means mounted to said base member and connected to said first hook means by a connecting member for clamping onto an object positioned between said first and second hook means;

locking means disposed and operable within said locking channel of said base member comprising a lockable lever pivotally connected to said connecting member for selectively extending and locking said connecting member, wherein said locking means is inaccessible when locked; and bicycle supporting means projecting from said base member for supporting a bicycle.

2. The bicycle carrier of claim 1 wherein said connecting member is flexible.

3. The bicycle carrier of claim 1 wherein said bicycle supporting means comprises dual support arms rigidly attached to said base member and projecting therefrom, trough members transversely positioned on said dual support arms for accepting the frame tube of a bicycle, and bicycle locking means mounted to said trough members for securing the bicycle frame in said trough members.

4. The bicycle carrier of claim 1 wherein said stabilizing means comprises a stabilizing arm pivotally connected to said base member at one end and terminating in a first jaw at its other end, a sliding arm slideably engaging said stabilizer arm at one end and terminating in a second jaw at its other end, and a spring intermediate said first jaw and said sliding engagement of said arms for urging said jaws against one another.

5. The bicycle carrier of claim 3 wherein said stabilizing means comprises a stabilizing arm pivotally connected to said base member at one end and terminating in a first jaw at its other end, a sliding arm slideably engaging said stabilizer arm at one end and terminating in a second jaw at its other end, and a spring intermediate said first jaw and said sliding engagement of said arms for urging said jaws against one another.

6. The bicycle carrier of claim 1 wherein said locking means further comprises a threaded adjustment member engaged with said lever member at one end and engaged with said connecting member at its other end.

7. The bicycle carrier of claim 2 wherein said locking means further comprises a threaded adjustment member engaged with said lever member at one end and engaged with said connecting member at its other end.

8. The bicycle carrier of claim 7 wherein said bicycle supporting means comprises dual support arms rigidly attached to said base member and projecting therefrom, trough members transversely positioned on said dual support arms for accepting the frame tube of a bicycle, and bicycle locking means mounted to said trough members for securing the bicycle frame in said trough members.

9. The bicycle carrier of claim 5 wherein said bicycle locking means comprises channel members depending from said trough members, lockable lever means pivotally connected to said channel members, a hook member pivotally connected to said lever means for grasping the bicycle frame tube, and adjusting means selectively disposed within said channel members for adjusting the length of said hook member wherein said adjusting means is inaccessible when disposed within said channel member.

10. The bicycle carrier of claim 7 wherein said bicycle locking means comprises channel members depending from said trough members, lockable lever means pivotally connected to said channel members, a hook member pivotally connected to said lever means for grasping the bicycle frame tube, and adjusting means selectively disposed within said channel members for adjusting the length of said hook member wherein said adjusting means is inaccessible when disposed within said channel member.

11. The bicycle carrier of claim 6 wherein said bicycle locking means comprises channel members depending from said trough members, lockable lever means pivotally connected to said channel members, a hook member pivotally connected to said lever means for grasping the bicycle frame tube, and adjusting means selectively disposed within said channel members for adjusting the length of said hook member wherein said adjusting means is inaccessible when disposed within said channel member.

* * * * *